US008338997B2

(12) United States Patent
Nishikawa

(10) Patent No.: US 8,338,997 B2
(45) Date of Patent: Dec. 25, 2012

(54) POWER TOOL

(75) Inventor: Tomomasa Nishikawa, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 55 days.

(21) Appl. No.: 12/620,732

(22) Filed: Nov. 18, 2009

(65) Prior Publication Data

US 2010/0123359 A1 May 20, 2010

(30) Foreign Application Priority Data

Nov. 19, 2008 (JP) ................................ 2008-296174

(51) Int. Cl.
*H02K 9/00* (2006.01)

(52) U.S. Cl. ........................................... 310/58; 310/64

(58) Field of Classification Search .................... 310/50, 310/52, 54, 58, 64
See application file for complete search history.

(56) References Cited

U.S. PATENT DOCUMENTS

| | | | | |
|---|---|---|---|---|
| 5,315,193 | A * | 5/1994 | Kummer et al. | 310/50 |
| 6,127,751 | A | 10/2000 | Kristen et al. | |
| 6,781,267 | B2 * | 8/2004 | Ortt et al. | 310/90 |
| 7,330,006 | B2 | 2/2008 | Iwata et al. | |
| 2001/0043806 | A1 * | 11/2001 | Gorti et al. | 388/800 |
| 2004/0027010 | A1 * | 2/2004 | Oomori et al. | 310/50 |
| 2005/0140233 | A1 * | 6/2005 | Kojima et al. | 310/156.37 |
| 2005/0269884 | A1 * | 12/2005 | Teranishi et al. | 310/50 |
| 2009/0145621 | A1 * | 6/2009 | Lau et al. | 173/217 |

FOREIGN PATENT DOCUMENTS

| | | | |
|---|---|---|---|
| CN | 1249225 | A | 4/2000 |
| CN | 1945936 | A | 4/2007 |
| JP | 2005-040881 | A | 2/2005 |

OTHER PUBLICATIONS

Office Action issued by State Intellectual Property Office of P.R.C. Jun. 23, 2011

* cited by examiner

*Primary Examiner* — Nguyen N Hanh
(74) *Attorney, Agent, or Firm* — Kenealy Vaidya LLP

(57) ABSTRACT

According to an aspect of the present invention, there is provided a power tool including: a motor that generates a rotational force; a power transmission mechanism that is driven by the motor to transmit the rotational force and that is connected to a bit; and a housing that houses the motor and the power transmission mechanism therein, wherein an electric fan for cooling the power transmission mechanism or the motor is provided inside the housing, wherein the power transmission mechanism, the motor and the electric fan are arranged in this order from front, and wherein the electric fan is disposed at a rear side so as to be interposed between the motor and a back wall of the housing.

12 Claims, 11 Drawing Sheets

(1)

(2)

POWER TOOL

CROSS-REFERENCE TO RELATED APPLICATIONS

This application is based upon and claims a priority from prior Japanese Patent Application No. 2008-296174 filed on Nov. 19, 2008, the entire contents of which are incorporated herein by reference.

BACKGROUND OF THE INVENTION

1. Field of the Invention

The present invention relates to a power tool which can be driven and rotated by a motor and, specifically, the invention relates to a power tool which is enhanced in durability and operation efficiency due to the improved cooling mechanism of the motor.

2. Description of the Related Art

As a power tool for fastening a screw, a bolt and the like, there is known an oil pulse tool which can generate a striking force using oil pressure. In the oil pulse tool, there is no collision between metals. Therefore, when compared with an impact tool of a mechanical type, the oil pulse tool has a characteristic that the operating sound thereof is low. As this type of oil pulse tool, for example, there is available a technology disclosed in JP-2005-040881-A which uses a motor as a power source for driving an oil pulse unit and also in which the output shaft of the motor is directly connected to the oil pulse unit. Since the oil pulse unit rises in temperature as it is used, there is interposed a fan between the motor and oil pulse unit (on the front end side of the motor); and, the motor can be cooled by the fan. When pulling a trigger switch which is used to operate the oil pulse tool, a drive current is supplied to the motor. In JP-2005-040881-A, there is interposed a reduction gear between the rotation shaft and output shaft of a motor, and necessary output torque is secured by driving a small-size motor at a high revolution, thereby reducing the size of the product, that is, the oil pulse tool.

In an ordinary power tool, there is interposed a reduction gear between the rotation shaft and output shaft of a motor, and necessary output torque is secured by driving a small-size motor at a high revolution, thereby reducing the size of the product, that is, the power tool. In an oil pulse tool, there is used oil pressure for generating a striking force and the rotation force of the motor is applied suddenly at a certain angle to a leading end tool which is mounted on the output shaft of the motor. In the striking operation, the tool receives a reaction force from the leading end tool side and this reaction force is applied to the support portion of a reduction gear; and, therefore, when a reduction gear is provided in the oil pulse tool, the reaction force becomes large, which increases vibrations in the striking operation. Thus, in order to reduce the vibrations in the striking operation, there is proposed a direct drive mechanism in which no reduction gear is interposed between the rotation shaft of the motor and oil pulse mechanism.

In order to employ the direct drive mechanism, it is necessary to use a motor of a type that provides a low speed and high torque. Generally, when compared with a high speed low torque type of motor using a reduction gear, the low speed high torque type of motor is large in size. Also, when the low speed high torque type of motor is used, it is necessary to sufficiently secure the strength of a bearing portion for supporting the rotor of the motor. Especially, during use of a tool using such motor, when there occurs a state different from the original use object of the tool (such as drop), if the strength of the rotor support portion is insufficient, there is a possibility that the tool can be broken due to the inertial force of the rotor. Therefore, the rotor support portion must be structured such that the two ends thereof secure sufficient strength respectively.

In the oil pulse mechanism, after striking, due to the action of the reaction force from the leading end tool side, the number of revolutions of the oil pulse unit is reduced; and, in a brushless dc motor including a direct drive mechanism, due to no provision of the reduction gear, the number of revolutions of the motor is also reduced. Suppose the brushless do motor is used, when the number of revolutions of the motor is reduced due to the reaction force, there is a possibility that a large current can be generated in a drive circuit to thereby raise the temperature of a switching element abnormally.

SUMMARY OF THE INVENTION

An object of the invention is to provide a power tool which is improved in the cooling efficiency of a power transmission mechanism for cooling a motor, an oil pulse unit and the like, thereby being able to enhance the durability of the power tool.

Another object of the invention is to provide a power tool which, by driving a fan asynchronously with the rotation of the motor, even when the motor is stopped, can maintain the improved cooling efficiency.

According to an aspect of the invention, there is provided a power tool including: a motor; a power transmission mechanism rotationally drivable by the motor to transmit the rotation force of the motor and connected to a bit; and, a housing for storing the motor and power transmission mechanism therein. Specifically, according to this power tool, an electric fan for cooling the power transmission mechanism or motor is provided in the inner portion of the housing; the power transmission mechanism, motor and electric fan are arranged in this order from front; and, the electric fan is disposed in the rear of the inner portion of the housing and is interposed between the motor and the back surface of the housing.

According to another aspect of the invention, the electric fan is a blower fan which includes a suction port, a case and a discharge port. The case of the electric fan is mounted onto the housing through an elastic member. Preferably, the elastic member may preferably be made of a foaming member and also the elastic member may be provided in such a manner that it surrounds the discharge port and a portion of the case of the blower fan.

According to still another aspect of the invention, the electric fan is structured in such a manner that it is driven asynchronously with the rotation of the motor. The motor is a brushless dc motor, and a motor drive circuit substrate including a switching element for controlling the brushless dc motor is disposed in the rear end of the brushless dc motor and is interposed between the motor and the electric fan. In the housing, there is formed a handle portion in such a manner that it extends downwardly from the portion of the body portion of the housing where the power transmission mechanism is stored.

According to first aspect of the invention, since the power transmission mechanism, motor and electric fan are arranged in this order from front, the power transmission mechanism and motor can be cooled efficiently. Also, since the electric fan is interposed between the motor and the back surface of the housing, the motor cooling operation can be carried out efficiently.

According to second aspect of the invention, since the electric fan sucks the air from front in the neighborhood of the rotation shaft and discharge the air from the side surfaces of the housing outwardly in the radial direction of the housing, the efficiency of the cooling operation by the electric fan can be enhanced.

According to third aspect of the invention, the rotation shaft of the motor is held by two bearings respectively disposed before and behind the motor, and the bearing to be disposed behind the motor is interposed between the motor and the electric fan. This can reduce the distance between the two bearings and also the two bearings can be realized using relatively small bearings.

According to fourth aspect of the invention, since the electric fan is a blower fan which includes a suction port, a case and a discharge port, when compared with an axial fan, the cooling effect can be enhanced.

According to fifth aspect of the invention, since the case of the electric fan is mounted onto the housing through an elastic member, the electric fan can be protected against vibrations.

According to sixth aspect of the invention, since the elastic member is made of a foaming member, the electric fan can be protected against vibrations and also the electric fan and housing can be sealed properly with respect to each other.

According to seventh aspect of the invention, since the elastic member is provided in such a manner that it surrounds the discharge port and a portion of the case of the blower fan, the discharge side and suction side of the blower fan can be kept airtight to thereby be able to prevent the air from flowing outside the blower fan and leaking to the outside.

According to eighth aspect of the invention, since the electric fan is driven asynchronously with the rotation of the motor, even in a state where the motor is stopping, the electric fan can be driven, whereby the motor can be cooled effectively.

According to ninth aspect of the invention, the motor is a brushless dc motor, and a motor drive circuit substrate including a switching element for controlling the brushless dc motor is disposed in the rear end of the brushless dc motor and is interposed between the motor and the electric fan. Owing to this structure, the motor and inverter circuit substrate can be both cooled effectively by the electric fan.

According to tenth aspect of the invention, since the electric fan is not mounted on the rotation shaft of the motor, the electric fan can be controlled independently without being influenced by the rotation of the motor, thereby being able to save power which the electric fan consumes.

DETAILED DESCRIPTION OF THE INVENTION

Now, description will be given below of an embodiment according to the invention with reference to the accompanying drawings. Here, in the following description of the present specification, as an example of a power tool, there is used an oil pulse tool; and, the upward, downward, forward and backward directions in the following description are such directions as shown in FIG. 1.

Figure 1:
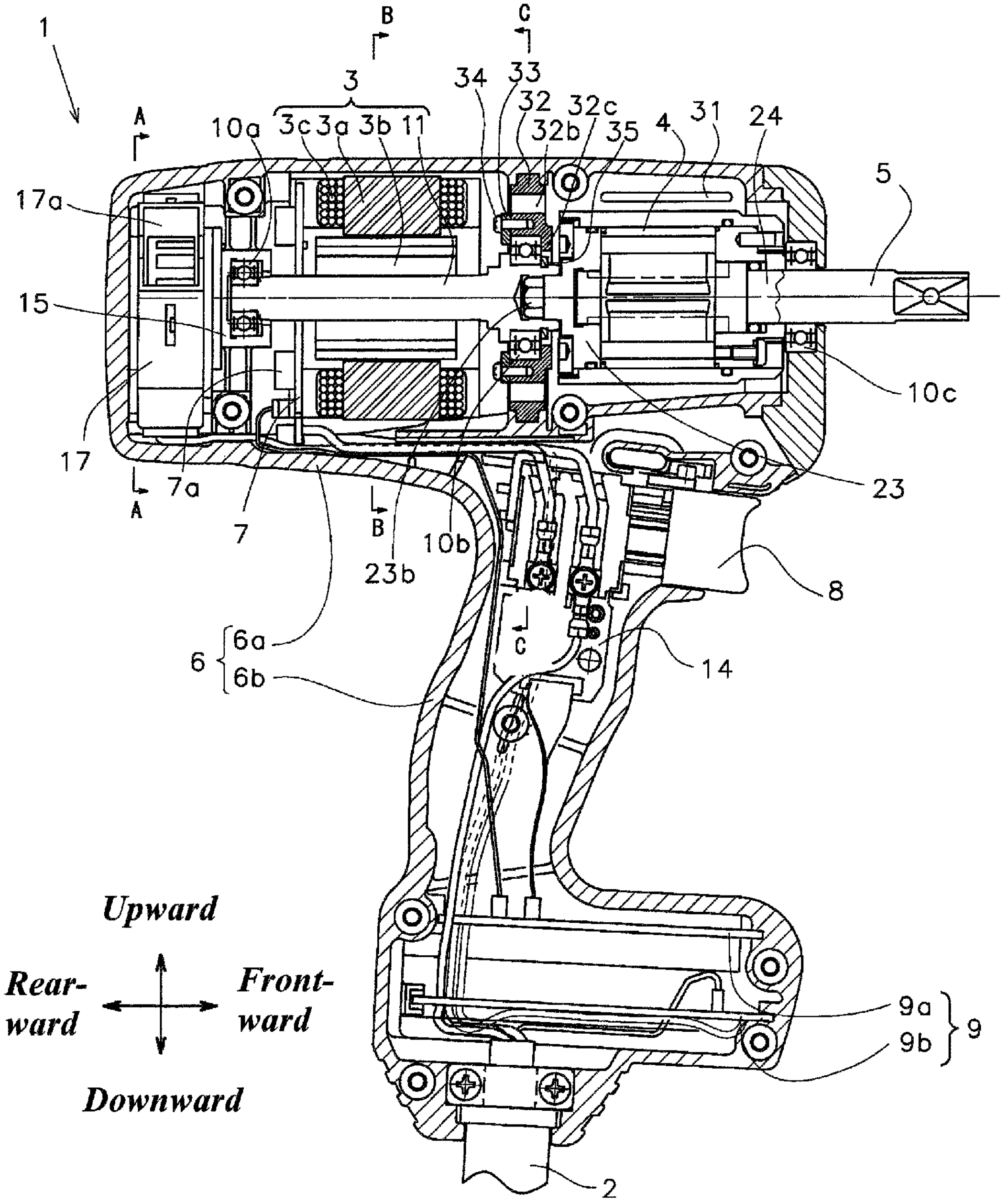
FIG. 1 is a section view of an oil pulse tool according to an embodiment.

FIG. 1 is a section view of the whole of an oil pulse tool according to the embodiment of the invention. The present oil pulse tool 1 uses power supplied through a power supply cord 2 from outside, uses a motor 3 as the drive source thereof, and drives an oil pulse unit 4 serving as a power transmission mechanism using the motor 3 to apply a rotation force and striking force to an output shaft 5 connected to the oil pulse unit 4, whereby a rotational striking force is transmitted continuously or intermittently to a leading end tool (not shown) such as a socket bit to carry out operations such as a screw fastening operation and a bolt fastening operation.

The power that is supplied through the power supply cord 2 is a dc power or an ac power such as AC 100V; and, for the ac power, after it is converted to a dc power by a rectifier (not shown) provided within the oil pulse tool 1, it is sent to the drive circuit of a motor. The motor 3 is a brushless dc motor which includes on the inner peripheral side thereof a rotor 3*b* having a permanent magnet and, on the outer peripheral side thereof, a stator having a winding 3*c* wound on an iron core 3*a*; and, the motor 3 is supported by two bearings 10*a* and 10*b* in such a manner that the rotation shaft 11 thereof can be rotated. The forwardly situated bearing 10*b* is a bearing having a large diameter and can be fixed through an inner plate 32 to the inside of the cylindrical body portion 6*a* of a housing 6. The backwardly situated bearing 10*a* is a bearing which is smaller in diameter than the forward bearing 10*b* and can be fixed to a bearing holder 15 which is formed integrally with the body portion 6*a*. The housing 6 can be produced by molding a plastic member or the like in such a manner that the body portion 6*a* and handle portion 6*b* are formed as an integral body.

In the rear of the motor 3, there is disposed a drive circuit substrate 7 which is used to drive the motor 3. On this circuit substrate 7, there are carried an inverter circuit made of a switching element 7*a* such as an FET (Field Effect Transistor) and a position detecting element such as a Hall IC which is used to detect the rotation position of the rotor 3. In the vicinity of the inside rear end of the body portion 6*a*, there is disposed a cooling fan unit 17. The cooling fan unit 17 can use an electrically operated centrifugal fan which can be rotated independently of the motor 3 and can suck the air from around the front shaft and discharge it in one direction in the circumferential direction; and, the cooling fan unit 17 can be driven by a small-size dc motor.

The housing 6 further includes a handle portion 6*b* which extends from the body portion 6*a* substantially at right angles in the downward direction and, in the vicinity of the mounting portion of the handle portion 6*b*, there is disposed a trigger switch 8. On the interior portion of the handle portion 6*b*, there is provided a switch circuit substrate 14 and a signal proportional to an amount that the trigger switch 8 is pulled can be transmitted to a motor control substrate 9*a*. On the lower side of the handle portion 6*b*, there are disposed multiple circuit substrates 9 which include the motor control substrate 9*a* and a power supply circuit substrate 9*b* for a cooling fan.

The oil pulse unit 4, which is stored on the front side of the body portion 6*a*, includes a liner plate 23 serving as the input shaft of the unit 4. The liner plate 23 is directly connected to the rotation shaft 11 of the motor 3, whereby the rotation of the motor 3 can be directly transmitted to the liner plate 23 without being reduced. Owing to this, on the inside of the bearing 10*b*, the connecting portion 23*a* of the liner plate 23 can be fitted into a hexagonal hole 11*f* which is formed in the leading end of the rotation shaft 11. Since the connecting portion between the liner plate 23 and rotation shaft 11 is disposed at the same position of the inner plate 32 in the axial direction in this manner, the rigidity of the connecting portion can be enhanced.

When the trigger 8 is pulled and the motor 3 is thereby started, the rotation of the motor 3 is transmitted to the oil pulse unit 4. The interior portion of the oil pulse unit 4 is filled with oil and, when no load is applied to the output shaft 5 or when a small load is applied, the output shaft 5 can be rotated substantially synchronously with the rotation of the motor 3 only due to the resistance of the oil. When a strong load is applied to the output shaft 5, the rotation of the output shaft 5 is caused to stop but only the liner of the oil pulse unit 4 on the outer peripheral side thereof is rotated on. Atone position per rotation, the pressure of the oil rises suddenly to apply a large fastening torque (striking force) to the output shaft 5, whereby the output shaft 5 is rotated with a large force. From this time on, a similar impact operation is repeated several times and the striking force is intermittently transmitted repeatedly until a fastening-receiving member is fastened with a set torque.

Figure 2:
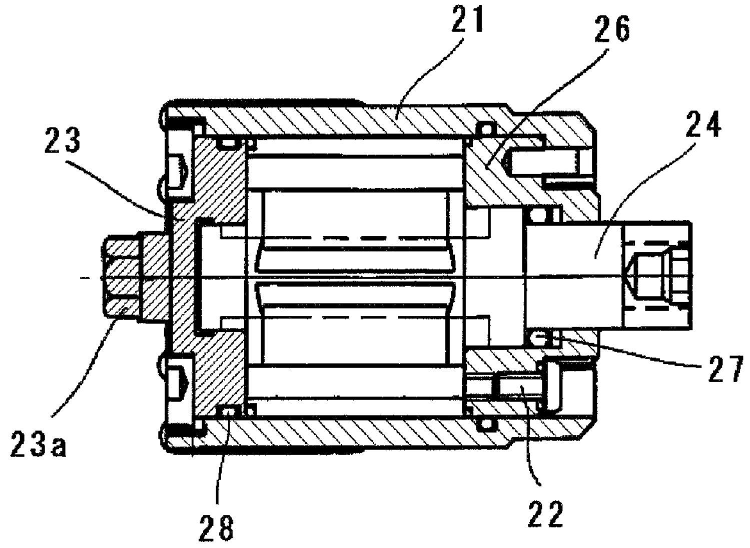
FIG. 2 illustrates an oil pulse unit 4 and a rotation shaft 11 shown in FIG. 1, FIG. 2(1) is an enlarged section view of the oil pulse unit 4, and FIG. 2(2) is an enlarged section view of the rotation shaft 11.
Figure 2:
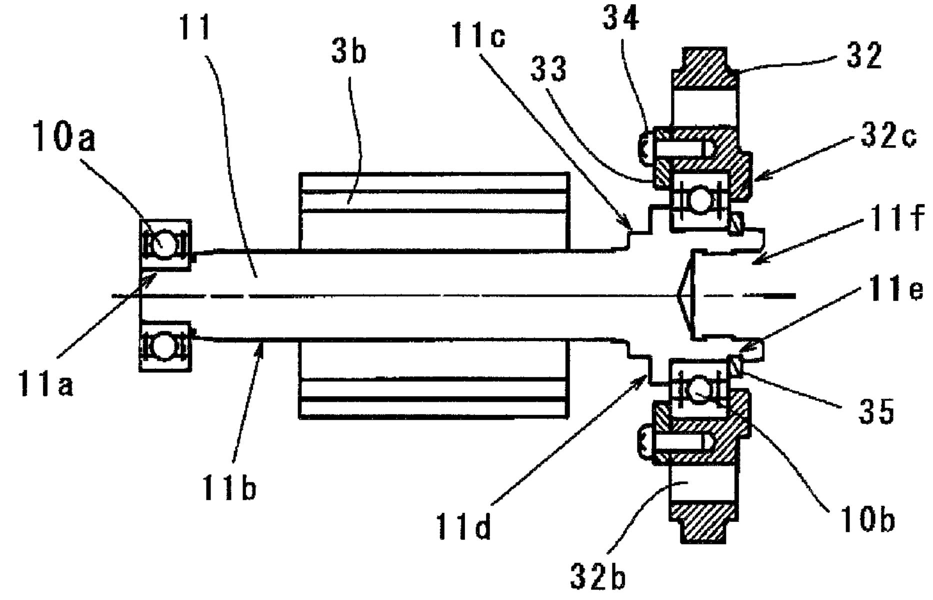
Figure 3:
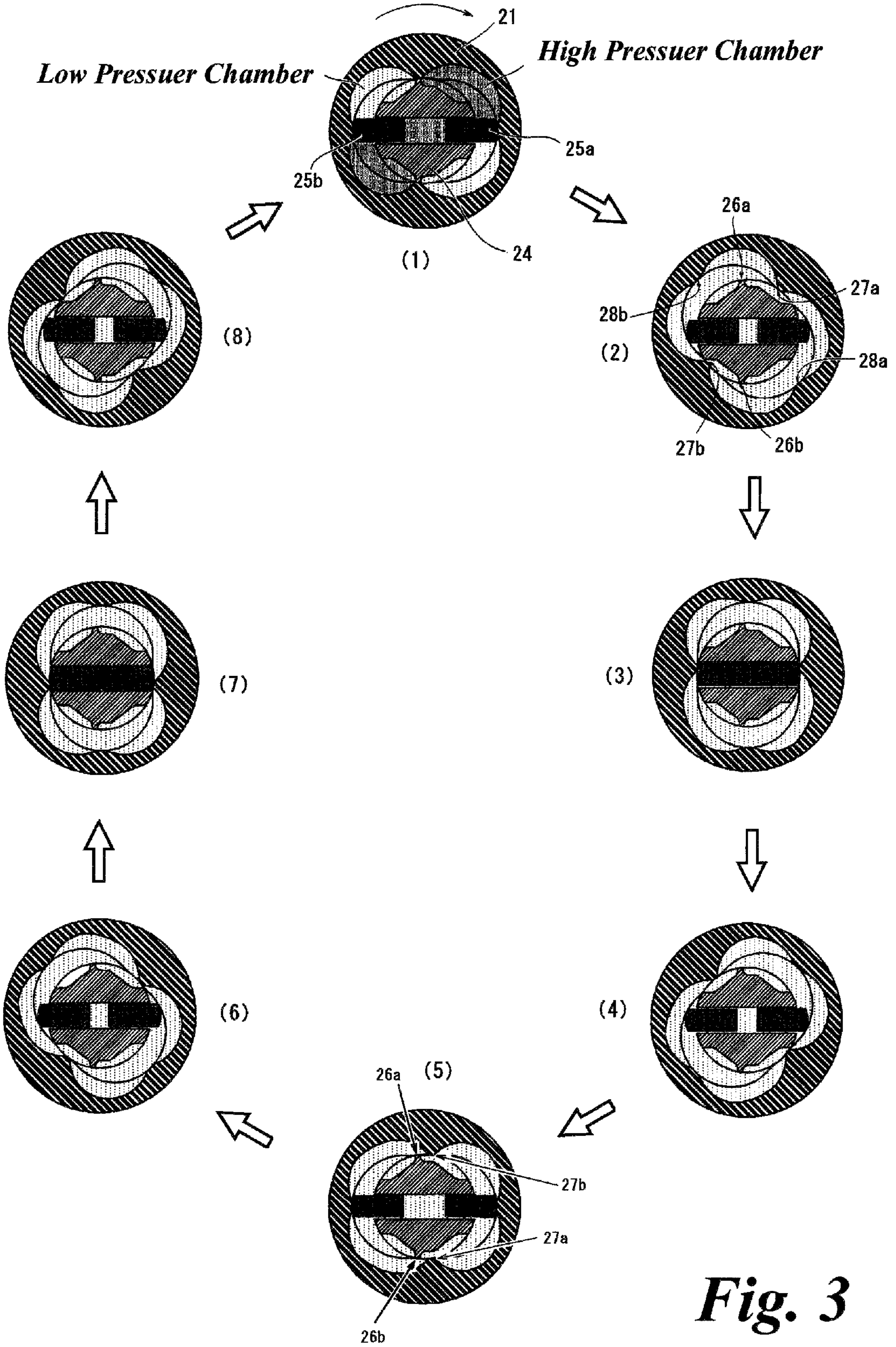
FIG. 3 is a section view of the oil pulse unit 4, taken along the surface thereof which extends perpendicular to the axial direction of the unit 4; specifically, it shows the one-rotation movement of the unit 4, when it is used, in eight stages.

FIG. 2(1) is a section view of the oil pulse unit 4 shown in FIG. 1, and FIG. 3 is a section view taken along the arrow line C-C shown in FIG. 1 and, specifically, it is a section view of the oil pulse unit 4, showing the one rotation movement thereof in 8 stages when it is used. The oil pulse unit 4 includes two main portions, that is, a drive portion rotatable synchronously with the motor 3 and an output portion rotatable synchronously with the output shaft 5 on which a leading end tool is to be mounted. The drive portion rotatable synchronously with the motor 3 includes a liner plate 23 to be directly connected to the rotation shaft of the motor 3, a liner 21 which is fixed to the outer peripheral side of the liner plate 23 in such a manner as extends forwardly and the outside diameter of which is substantially cylindrical, and a lower plate 26 which is fixed to the forward inner peripheral side of the liner 21. The output portion rotatable synchronously with the output shaft 5 includes a main shaft 24 and blades 25*a*, 25*b* (FIG. 3) which can be mounted onto the main shaft 24 through springs.

The main shaft 24 penetrates through the lower plate 26 and is supported in such a manner that it can be rotated within the liner 21. Between the liner 21 and main shaft 24, there is filled operating oil, while the operating oil is sealed up by the liner plate 23 and lower plate 26 which are respectively mounted on the two ends of the liner 21. Between the lower plate 26 and main shaft 24 as well as between the liner 21 and liner plate 23, there are interposed O rings 27 and 28 which are used to secure an airtight condition between them, respectively. Here, the liner 21 includes a relief valve 22 which is used to relieve the pressure of the oil from a high pressure chamber to a low pressure chamber. Therefore, the maximum pressure of oil generated can be controlled and thus the fastening torque can be adjusted.

Within the liner 21, there is formed a liner chamber having a section in which there are formed substantially four such areas as shown in FIG. 3. Into the outer peripheral portion of the main shaft 24, more specifically, into mutually opposed two groove portions thereof, there are inserted blades 25*a* and 25*b* through springs; and, the blades 25*a* and 25*b* are energized by the springs so that they can be contacted with the inner surface of the liner 21. On the outer peripheral surface of the main shaft 24 existing between the blades 25*a* and 25*b*, there are provided projecting seal surfaces 26*a* and 26*b* which are respectively formed of two projecting strip-like surfaces extending in the axial direction of the main shaft 24. On the inner peripheral surface of the liner 21, there are provided chevron-like raised portions, that is, projecting seal surfaces 27*a*, 27*b* and projecting portions 28*a*, 28*b*.

In the oil pulse tool 1, in the bolt fastening operation, when the seat surface of the fastening bolt is seated, there is applied a load to the main shaft 24, whereby the main shaft 24, blades 25*a*, and 25*b* are almost caused to stop, whereas only the liner 21 rotates on. With the rotation of the liner 21 due to the rotation of the motor 3, there is generated an impact pulse per rotation. In this impact pulse generating time, within the oil pulse tool 1, the projecting seal surface 27*a* formed on the inner peripheral surface of the liner 21 is contacted with the projecting seal surface 26*a* formed on the outer peripheral surface of the main shaft 24. At the same time, the projecting seal surface 27*b* formed on the inner peripheral surface of the liner 21 is contacted with the projecting seal surface 26*b* formed on the outer peripheral surface of the main shaft 24. In this manner, since the projecting seal surfaces formed on the inner peripheral surface of the liner 21 are respectively contacted with the projecting seal surfaces formed on the outer peripheral surface of the main shaft 24, the inside of the liner 21 is divided into two high pressure chambers H and two low pressure chambers L. And, due to the pressure difference between the high pressure chambers H and low pressure chambers L, the main shaft 24 is rotated so as to fasten the fastening bolt.

Next, description will be given below of the operation procedure of the oil pulse unit 4. Firstly, by pulling the trigger 8, the motor 3 is rotated and, with the rotation of the motor 3, the liner 21 is also rotated synchronously. FIGS. 3(1)~(8) show a state where the liner 21 rotates one time at a relative angle with respect to the main shaft 24. As described above, when no load is applied to the output shaft 5, or when a small load is applied to the output shaft 5, only due to the resistance of the oil, the main shaft 24 can be rotated substantially synchronously with the rotation of the motor 3. When a strong load is applied to the output shaft 5, the rotation of the main shaft 24 directly coupled to the output shaft 5 is caused to stop, whereas only the liner 21 existing outside the main shaft 24 rotates on.

FIG. 3(1) shows the position relationship when there is generated in the main shaft 24 a striking force due to the impact pulse. The position shown in FIG. 3(1) is the position where the oil is sealed up, while such sealed-up state appears one time per rotation. Here, the projecting seal surfaces 27*a* and 26*a* are contacted with each other, the seal surfaces 27*b* and 26*b* are contacted with each other, the blade 25*a* and projecting portion 28*a* are contacted with each other, and the blade 25*b* and projecting portion 28*b* are contacted with each other respectively over the whole area of the main shaft 24 in the axial direction thereof, whereby the internal space of the liner 21 is divided into four chambers, that is, two high pressure chambers and two low pressure chambers.

Here, the terms "high pressure" and "low pressure" are used to express the pressure of the oil that exists in the inside of the main shaft 24. Further, when the liner 21 is rotated due to the rotation of the motor 3, the capacity of the high pressure chamber is reduced and thus the oil is compressed to thereby generate high pressure instantaneously; and, this instantaneous high pressure pushes the blade 5 toward the low pressure chamber side. As a result of this, to the main shaft 24, there is instantaneously applied a force through the upper and lower blades 25*a* and 25*b*, thereby generating a strong torque. Formation of such high pressure chamber applies such a strong striking force to the blades 25*a* and 25*b* as rotate them clockwise in FIG. 3(1). The position shown in FIG. 3(1) is referred to as "a striking position" in the present specification.

FIG. 3(2) shows a state where the liner 21 has rotated 45 degrees from the striking position. Since, after passage of the striking position shown in FIG. 3(1), the contact states between the projecting seal surfaces 27*a* and 26*b*, the projecting seal surfaces and seal surface 26*b*, the blade 25*a* and projecting portion 28*a*, and, the blade 25*b* and projecting portion 28*b* are removed respectively, the divided state of the four divisional chambers of the inner space of the liner 21 is removed and the oil is thereby allowed to flow between the spaces; and, therefore, no torque can be generated and thus the liner 21 is allowed to rotate further due to the rotation of the motor 3.

FIG. 3(3) shows a state where the liner 21 has rotated 90 degrees from the striking position. In this state, since the blades 25*a* and 25*b* are contacted with the projecting seal surfaces 27*a* and 27*b* respectively and are moved back inwardly in the radial direction to positions where they do not project from the main shaft 24, they are not influenced by the pressure of the oil and thus no torque is generated, whereby the liner 21 is allowed to rotate as it is. FIG. 3(4) shows a state where the liner 21 has rotated 135 degrees from the striking position. In this state, since the internal spaces of the liner 21 is in communication with each other and thus the pressure of the oil is not changed, no rotation torque is generated in the main shaft 21.

FIG. 3(5) shows a state where the liner 21 has rotated 180 degrees from the striking position. In this position, the projecting seal surfaces 27*a* and 26*a* approach each other, and the projecting seal surface 27*b* and seal surface 26*b* approach each other, but they are not contacted with each other. This is because the projecting seal surfaces 26*a* and 26*b* formed in the main shaft 24 are not symmetric in position with respect to the axis of the main shaft 24. Similarly, the projecting seal surfaces 27*a* and 27*b* formed in the inner periphery of the liner 21 are not symmetric in position with respect to the axis of the main shaft 24, either. Therefore, in this position, since the main shaft 24 is hardly influenced by the oil pressure, there is hardly generated torque in the main shaft 24. Here, the reason why the torque generated in this position is not zero is as follows: that is, the oil charged into the inside of the main shaft has viscosity and thus, when the projecting seal surfaces 27*b* and 26*a* face each other or the projecting seal surfaces 27*a* and 26*b* face each other, there is formed a high pressure chamber although the degree of the high pressure is slight, whereby, differently from the states of FIGS. 3(2)~(4), (6)~(8), there is generated a slight level of rotation torque.

The states shown in FIGS. 3(6)~(8) are almost similar to those shown in FIGS. 3(2)~(4) and, in these states, no torque is generated. When the line 21 rotates further from the state shown in FIG. 3(8), the state returns to the state shown in FIG. 3(1). That is, the projecting seal surfaces 27*a* and 26*a* are contacted with each other, the seal surfaces 27*b* and 26*b* are contacted with each other, the blade 25*a* and projecting portion 28*a* are contacted with each other, and the blade 25*b* and projecting portion 28*b* are contacted with each other respectively over the whole area of the main shaft 24 in the axial direction thereof, whereby the internal space of the liner 21 is divided into four chambers, that is, two high pressure chambers and two low pressure chambers. Therefore, there is generated a strong rotation torque in the main shaft 24.

As described above, in the fastening operation, since the viscous oil is repeatedly pressurized and depressurized, the oil is caused to generate heat. Also, since the rotation of the motor 3 is controlled in the striking operation, or, according to cases, the rotation is stopped (the motor is locked), or the motor 3 is rotated reversely although slightly, an excessive amount of current flows in the inverter circuit and stator winding of the motor, thereby causing the winding 3*c* and switching element 7*a* to generate heat. As a measure to prevent such heat generation, there is provided such a cooling fan unit 17 as shown in FIG. 1.

Referring back again to FIG. 1, the cooling fan unit 17, motor 3 and oil pulse unit 4 are stored within the body portion 6*a* of the housing 6, and they are disposed substantially parallel to the direction of the rotation axis of the main shaft 5 in the order of the oil pulse unit 4, motor 3 and cooling fan unit 17. Strictly speaking, preferably, the oil pulse unit 4 and motor 3 may be disposed coaxially with each other; however, the cooling fan unit 17 may not be completely coaxially with these parts but the center axis thereof may also be shifted slightly, or the rotation shaft of the cooling fan unit 17 may also be disposed at a certain angle with respect to the rotation shaft 11 of the motor 3.

The oil within the oil pulse unit 4 can vary greatly in the property thereof due to heat and thus it is necessary to cool such oil most; and, therefore, it is efficient that the introduced air is firstly applied to the oil pulse unit 4 for cooling it. Therefore, according to the present embodiment, laterally of the portion of the body portion 6*a* where the oil pulse unit 4 is provided, there are formed multiple air intake ports 31 and, by driving the cooling fan unit 17, the air can be sucked in from the outside through the air intake ports 31. Although only one port is shown in FIG. 1, four air intake ports 31 on the right of the body portion 6*a* and four on the left thereof, a total of eight slit-like air intake ports 31 are formed in such a manner that the longitudinal directions thereof are substantially parallel to the output shaft 5. Here, the shape of the air intake port 31 has a relatively high freedom; that is, the direction of the slit may be set in the circumferential direction of the body portion 6*a*, or the air intake port 31 may have an arbitrary shape.

The air, which has been introduced from the air intake ports 31, cools the oil pulse unit 4 firstly, then passes through the ventilation port 32*d* of the inner plate 32 and flows toward the motor 3. In the motor 3, the air flows through a space between the rotator 3*d*, iron core 3*a* and winding 3*c* and flows backwardly, thereby cooling electronic elements provided on the drive circuit substrate 7 disposed backwardly of the motor 3 and perpendicularly to the axial direction of the motor 3. After then, the air is sucked from the neighborhood of the shaft of the cooling fan unit 17, is discharged in the circumferential direction from a discharge port 17*a* by the fan, passes through an air discharge port (which will be discussed later) formed in the body portion 6*a*, and is finally discharged to the outside of the housing 6.

According to the present embodiment, due to use of the brushless motor having a direct drive mechanism, in the striking operation, the number of rotations of the motor 3 is small and thus a large current flows in the winding 3*c*, whereby the temperature of the switching element 7*a* is easy to rise. Therefore, by disposing the drive circuit substrate 7 in the neighborhood of the cooling fan unit 17, that is, in the rear of the motor 3, the amount of the cooling air in the neighborhood of the switching element 7*a* is increased to thereby be able to enhance the cooling efficiency, and thus the durability of the power tool can be enhanced.

The cooling fan unit 17 is driven separately from the driving of the motor 3. Owing to this, even when the rotation of the motor 3 is caused to stop, it is possible to cool the oil pulse unit 4 and motor 3 which have generated heat. The cooling fan unit 17 is provided into the body portion 6*a* of the housing 6 through an elastic member 30. Thanks to this, vibrations caused by the oil pulse unit 4 in the striking operation are prevented from being transmitted to the cooling fan unit 17, thereby being able to prevent the breakage of the cooling fan unit 17. Further, although, in driving the cooling fan unit 17, there are generated noises due to the rotation vibrations of the unit 17, since the cooling fan unit 17 is provided into the body portion 6*a* of the housing 6 through the elastic member 30, such rotation vibrations can be restricted. Since the elastic member 30 is made of foaming material, the vibration restricting effect of the elastic member 30 can be enhanced and also the weight of the elastic member 30 can be reduced.

The rotor 3*b* of the motor 3 is provided on the rotation shaft 11. FIG. 2(2) shows the rotation shaft 11 shown in FIG. 1 in an enlarged manner. The rotation shaft 11 is supported by the bearing 10*b* on the side thereof that is connected to the oil pulse unit 4. As the bearing 10*b*, there is used a bearing having a larger diameter than the bearing 10*a*. The portion of the rotation shaft 11, on which the bearing 10*a* is mounted, is a small-diameter portion 11*a* which is slightly smaller in diameter than the shaft diameter portion 11*b* of the rotation shaft 11; and, the portion of the rotation shaft 11, on which the bearing 10*b* is mounted, is a large-diameter portion 11*c* which is slightly larger in diameter than the shaft diameter portion 11*b*. In a portion of the large-diameter portion 11*c*, there is formed a flange 11*d* the diameter of which extends outwardly in the radial direction. The bearing 10*b* is inserted into the large-diameter portion 11*c* from the front shaft end portion of the rotation shaft 11 and is disposed such that its inner ring can be contacted with the flange 11*d*. And, a locating snap ring 35 is mounted into a ring groove 11*e*, whereby the bearing 10*b* can be fixed to the rotation shaft 11.

On to the outer ring side of the bearing 10*b*, there is mounted the inner plate 32, the front end portion of the outer ring of the bearing 10*b* is positioned such that it can be contacted with a flange 32*c*, and a plate 33 is threadedly engaged with a screw 34, whereby the bearing 10*b* is fixed to the inner plate 32. The inner plate 32 is a plate-shaped member which has substantially the same thickness as the bearing 10*b*; and, preferably, it may be made of metal such as an aluminum alloy or a stainless steel alloy. On both sides of the bearing 10*b*, that is, on the inner and outer ring sides thereof, there are provided slippage preventive portions which are used to prevent the bearing 10*b* from moving in the axial direction (in the back-and-forth direction) with respect to the inner plate 32. In this manner, since the bearing 10*b* is made of a relatively large diameter bearing and is able to hold the rotation shaft 11 firmly, under different use conditions from the originally expected use conditions of the tool, such as the condition where the tool can drop down, even when a sudden load is applied to the rotation shaft side of the tool from backwardly or forwardly of the main body of the tool, a load generated due to the inertial force of the oil pulse unit 4 and rotor 3*b* is received mainly by the bearing 10*b*. Thus, the strength of the fixing portion of the bearing 10*a* may be set so as to stand only a load which is applied thereto during rotation. This makes it possible to reduce the thickness or the like of the support portion (bearing holder 15) of the bearing 10*a*, thereby being able to reduce the size of the tool. Further, since the bearing 10*a* and bearing holder 15 can be reduced in size, the passing area of the cooling air flowing through the rear end portion of the motor 3 can be set wide, which can increase the amount of the cooling air and thus enhance the cooling performance of the tool.

Figure 4:
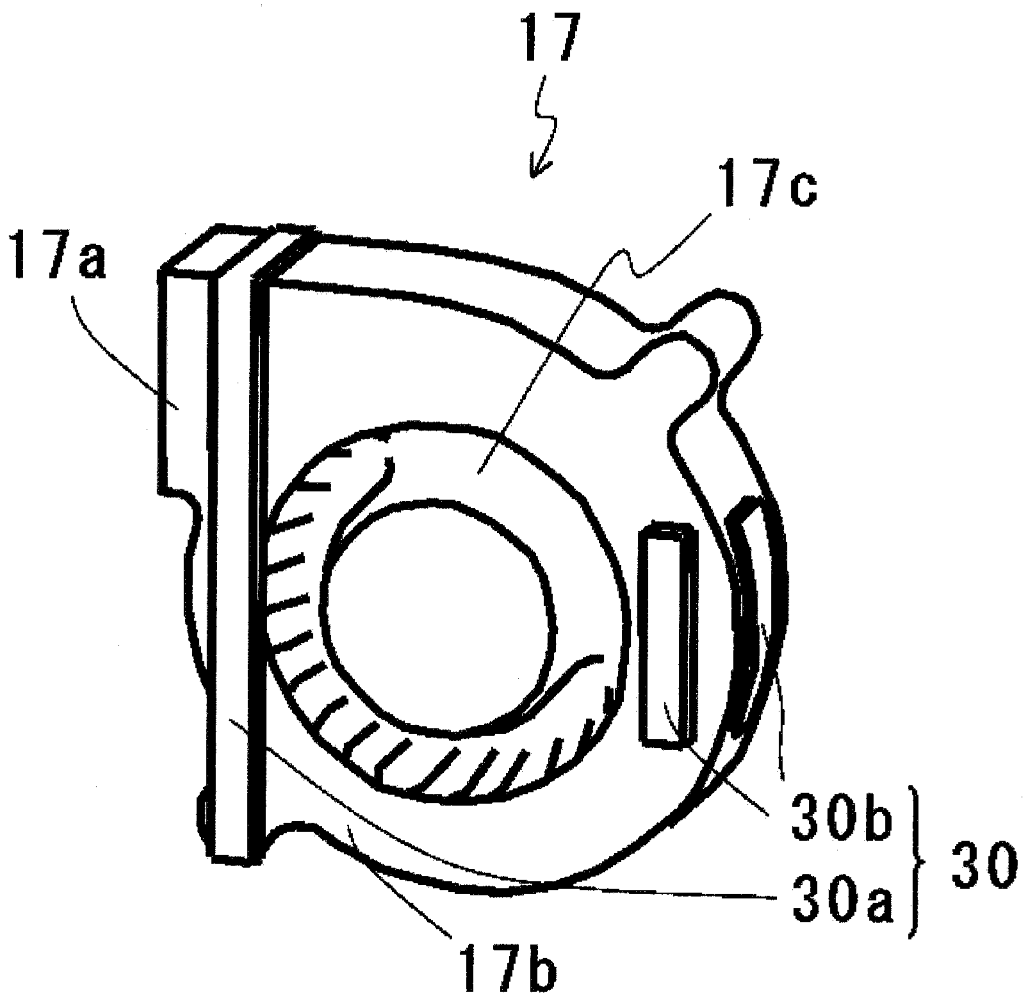
FIG. 4 is a perspective view of a cooling fan unit 17 shown in FIG. 1, when it is viewed from front.

FIG. 4 is a perspective view of the cooling fan unit 17 and elastic member 30. The cooling fan unit 17 is a general-purpose blower fan which includes a suction port 17*c* for sucking in the air in the axial direction, a fan housing 17*b* for storing a rotating fan and also for guiding the air to be sucked and discharged in a desired direction, and a discharge port 17*a* for discharging the air in one direction. The elastic member 30 is bonded to the cooling fan unit 17 with adhesive agent or double-sided adhesive tape. The elastic member 30 and adhesive material fulfill the bonding function to fix the cooling fan unit 17 to the inner wall of the housing 6 and also the vibration restricting function to reduce the vibrations to be transmitted to the cooling fan unit 17. Further, the elastic member 30*a* carries out the seal function to cut off the discharge port 17*a* from a space on the suction port 17*c* side.

Figure 5:
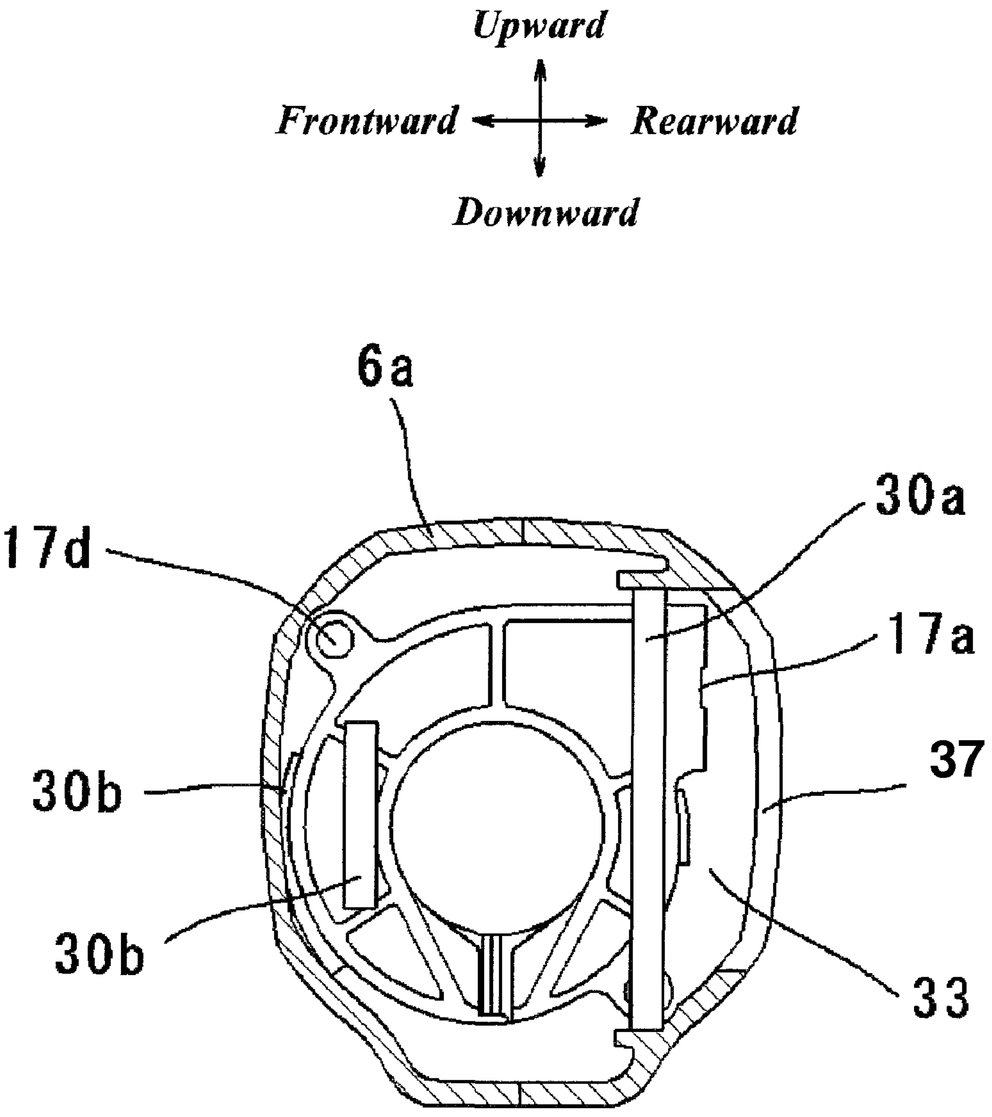
FIG. 5 is a section view of the arrow mark A-A line portion shown in FIG. 1, that is, it is a back view of the cooling fan unit 17 when it is viewed from behind.

FIG. 5 is a section view of the A-A portion shown in FIG. 1, showing a state where the cooling fan unit 17 is set in the interior portion of the body portion 6*a* of the housing 6. The cooling fan unit 17 is fixed in such a manner that the discharge port 17*a* thereof is disposed opposed to an air discharge port 37 formed in the body portion 6*a* of the housing 6. Although the cooling fan unit 17 includes a mounting hole 17*d* for mounting the cooling fan unit 17, since the cooling fan unit 17 is disposed within a space surrounded by the rear end portion of the housing 6, it is sufficient to fix the cooling fan unit 17 using a seal member such as a double-sided adhesive tape without fixing it with a screw firmly. However, of course, the cooling fan unit 17 may also be fixed by the seal member and screw in combination.

Between the discharge port 17*a* and air discharge port 37, there is interposed a buffer area 33. This makes it possible to increase the section area of the air discharge port 37 over the discharge port 17*a*. Thus, even when multiple ribs or the like are provided in the air discharge port 37 to prevent a foreign object against entrance, it is possible to reduce the flow-out loss of the air in the air discharge port 37. Further, since there is provided a seal-like elastic member 30*a* in such a manner that it encloses the discharge port 17*a* and a portion of the fan housing 17*b*, the cooling fan unit 17 can be held by the elastic member 30*a* and also the cooling air flown from the discharge port 17*a* into the buffer area 33 is allowed to flow back toward the motor 3.

Figure 6:
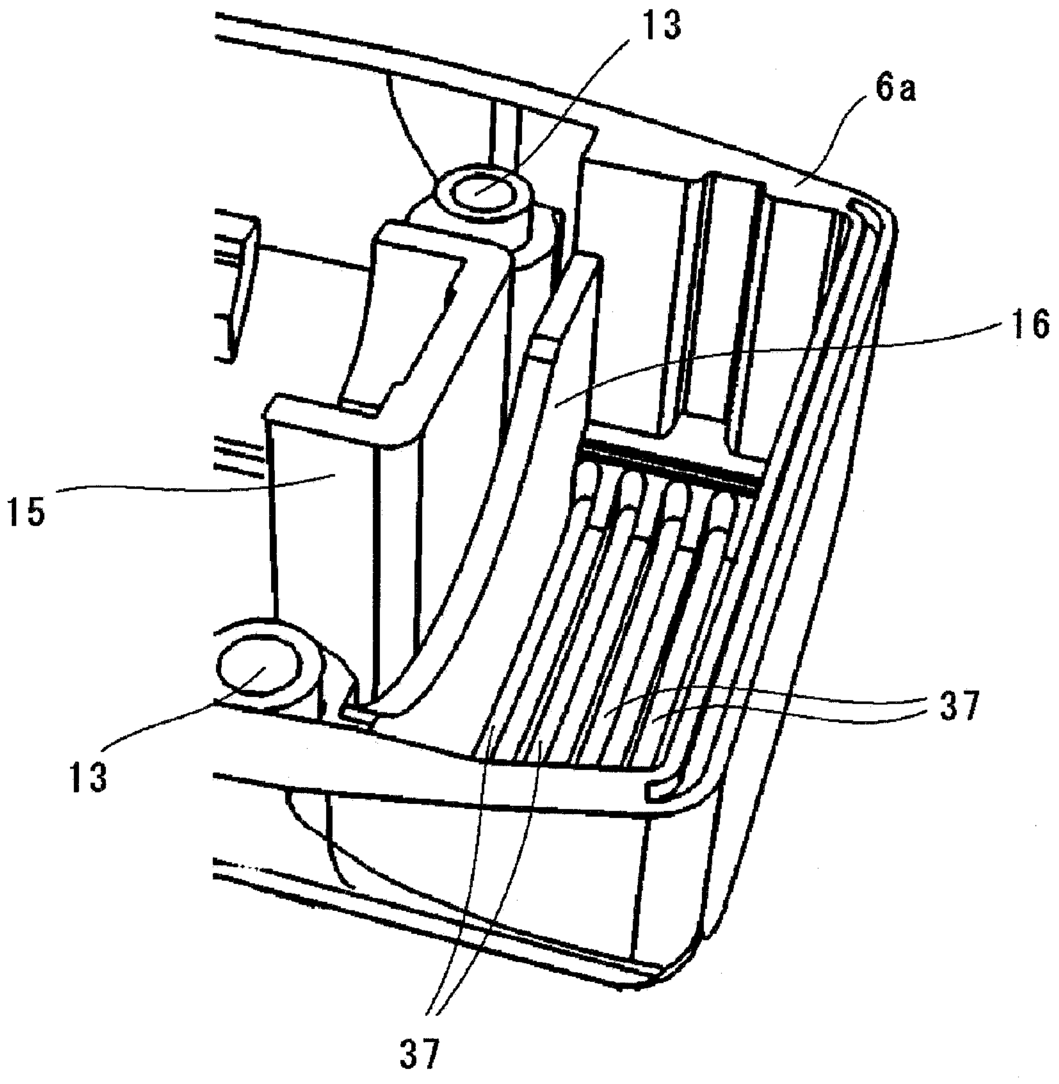
FIG. 6 is a partially perspective view of the body portion 6*a* of a housing 6, showing the shape of the inner portion on the right side of the rear end portion of the body portion 6*a*.

FIG. 6 is a partially perspective view of the shape of the inner portion on the right side of the rear end portion of the body portion 6*a* of the housing 6 on which the cooling fan unit 17 is to be mounted. Here, the housing 6 can be divided into two at a surface passing through the axial direction and extending vertically; and, the term "right side" means the side which, when an operator holds an oil pulse tool with his or her right hand, is situated on the right when it is viewed from the operator. Integrally with the rear end portion of the body portion 6*a*, there is formed a bearing holder 15 which serves as a fixing portion for holding the bearing 10*a*; and, in the rear of the bearing holder 15, there is provided a rib 16 which is used to fix the cooling fan unit 17 and also to separate the cooling fan unit from the space (buffer area 33) existing on the discharge port 17*a* side of the cooling fan unit 17. Backwardly of the rib 16, there are formed four slit-like air discharge ports 37 which respectively extend vertically. On the upper and lower sides of the bearing holder 15, there formed two screw holes 13 respectively for screwing the bearing holder 15 to the housing 6 situated on the left side of the bearing holder 15. Although not shown, in the shape of the left side inner portion of the rear end portion of the body portion 6*a*, there are formed the screw holes 13 and bearing holder 15, while there are formed neither the rib 16 nor air discharge portion 37.

Here, in FIG. 6, as can be understood easily, no opening exists in the rear end face of the housing 6. The reason for this is that the cooling fan unit 17 is made of a blower fan the discharge side of which is not set in the back side thereof but in the lateral side thereof. When there is used another type of cooling fan, an air discharge port may also be formed in the rear end face of the housing 6.

Figure 7:
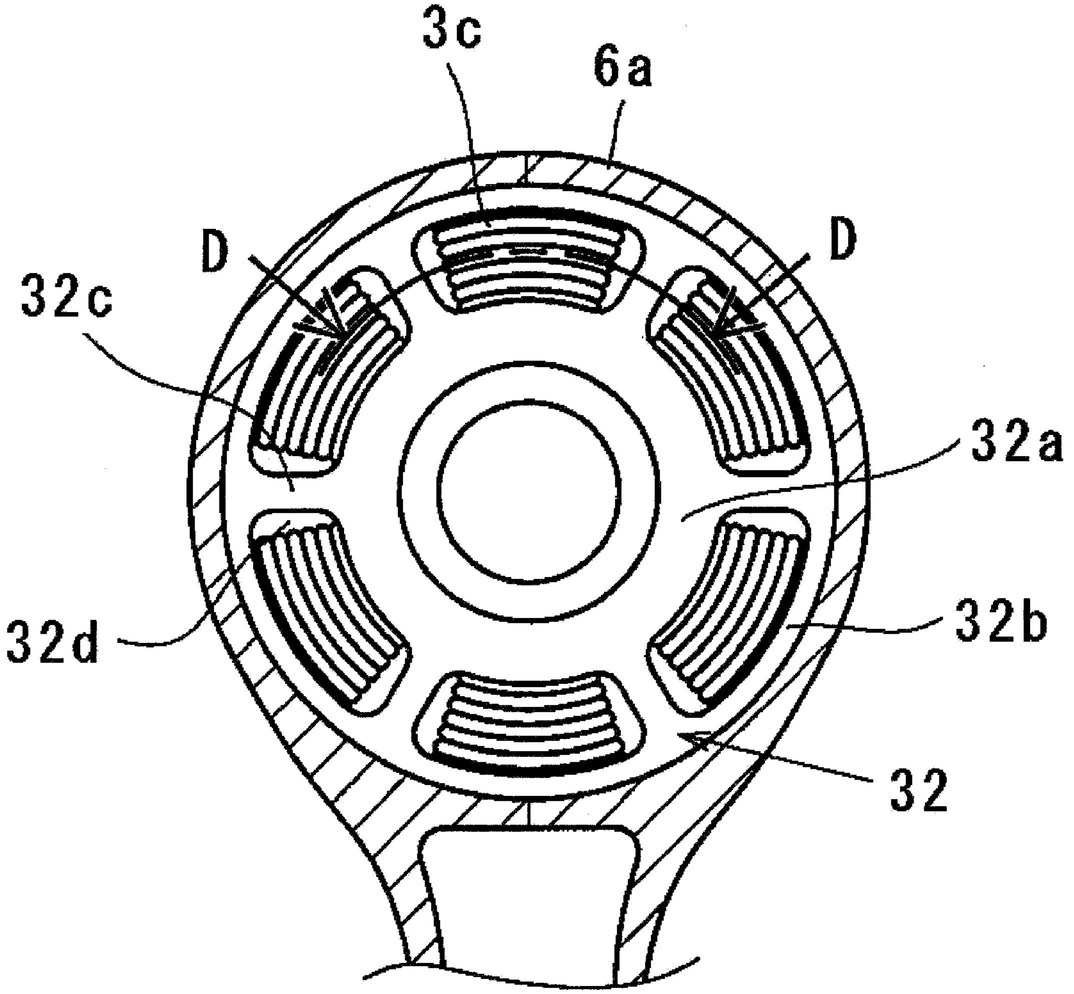
FIG. 7 is a section view taken along the arrow mark C-C line portion shown in FIG. 1, showing the position relationship between an inner plate 32 and the windings 3*c* of a motor 3.

Next, description will be given below of the shape of the inner plate 32 and the flow of the cooling air passing through the inner plate 32 with reference to FIGS. 7~9. FIG. 7 is a section view taken along the arrow line C-C shown in FIG. 1. The inner plate 32 includes a ring-shaped inner peripheral ring 32*a*, a ring-shaped outer peripheral ring 32*b*, and multiple support pillars 32*c* for connecting together the two rings 32*a* and 32*b*, while these parts cooperate together in forming multiple ventilation ports 32*d* for allowing the cooling air to flow therethrough. Here, as can be understood from FIG. 7, the number and position of the support pillars 32*c* in the circumferential direction of the inner plate 32 are set such that they coincide with the number and position of clearances between the windings 3*c* of the motor 3. Therefore, since the ventilation ports 32*d* are situated at such positions as opposed to the windings 3*c* of the motor 3, the air, which flows from the oil pulse unit 4 side to the motor 3 side through the ventilation ports 32*d*, will certainly be contacted with the windings 3*c*. Further, In the diameter direction of the inner plate 32, the positions of the inner peripheral ring 32*a* and outer peripheral ring 32*b* thereof are set such that they almost coincide with the positions of the inner and outer peripheral sides of the windings 3*c* of the motor 3.

Figure 8:
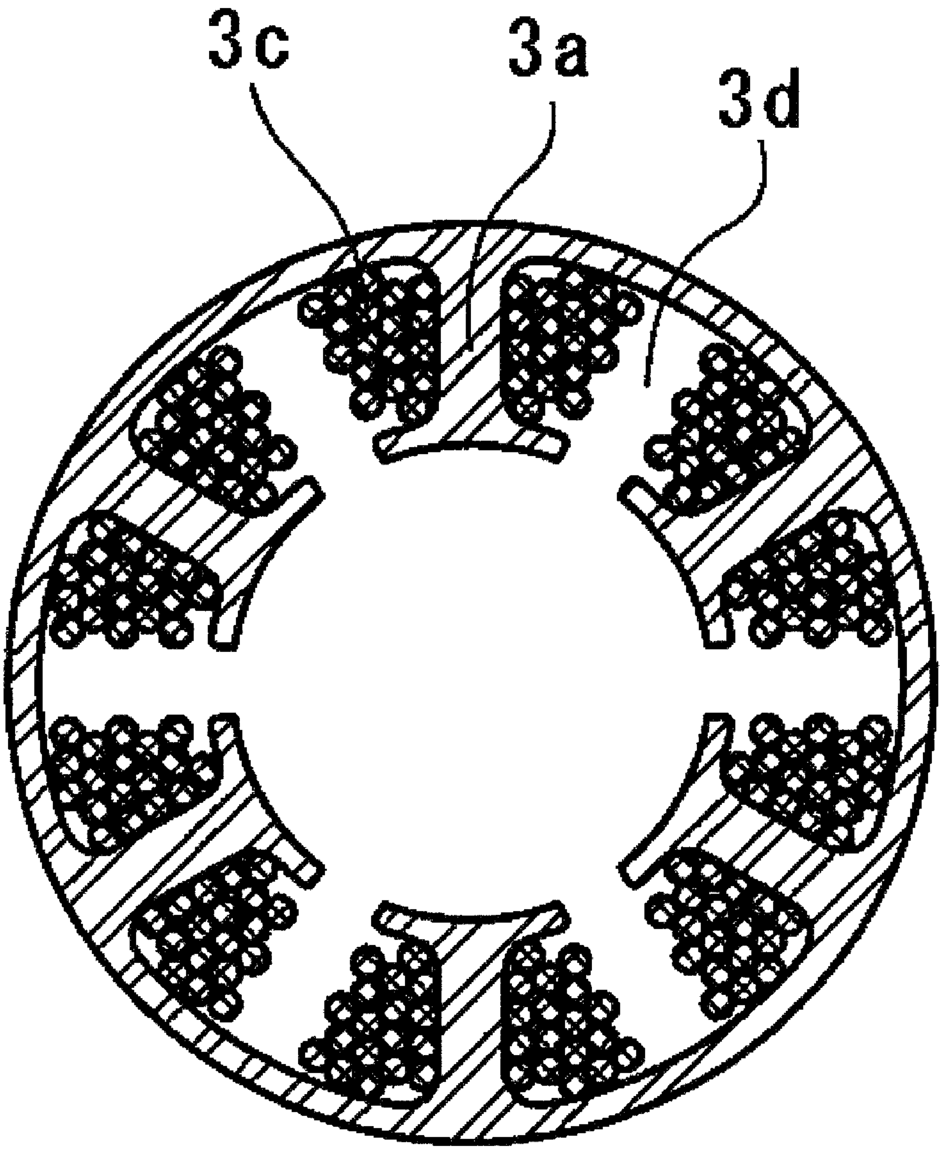
FIG. 8 is a section view of the stator portion of the motor 3, taken along the arrow mark B-B portion shown in FIG. 1.

FIG. 8 is a section view of the stator portion of the motor 3, taken along the arrow line B-B portion shown in FIG. 1, that is, it is a section view of the stator 3*b* portion of the motor 3. In the stator 3*b*, windings 3*c* are wound on an iron core 3*a*, while slots (winding clearances) 3*d* are interposed between the windings 3*c*. As can be seen from FIG. 8, according to the present embodiment, the windings of the motor 3 are wound densely in the outer peripheral portion of the motor 3, while the number of windings in the inner peripheral portion of the motor 3 is smaller than the number in the outer peripheral portion thereof.

Figure 9:
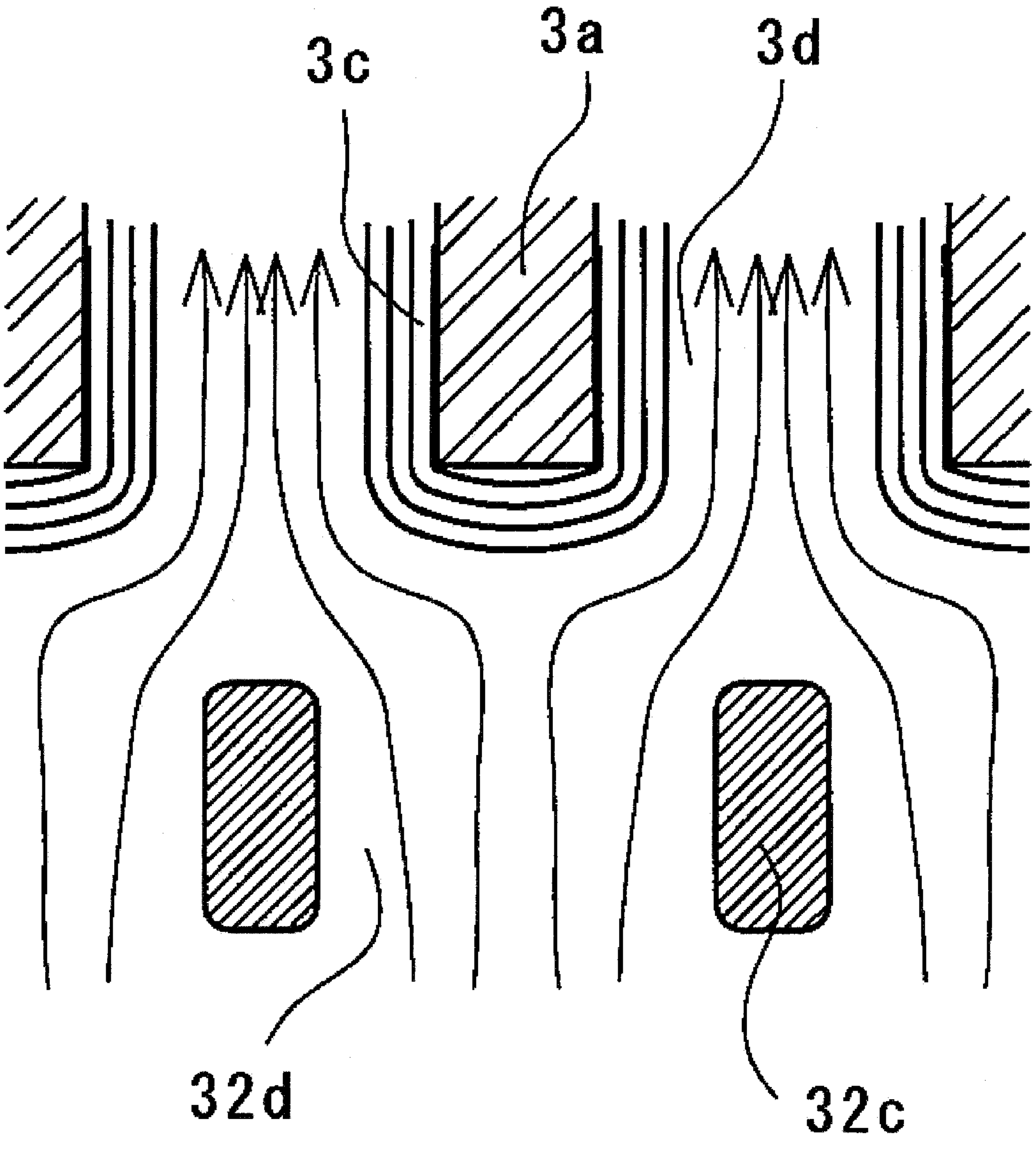
FIG. 9 is a section view of the arrow mark D-D portion shown in FIG. 7, showing the position relationship between the inner plate 32 and the windings 3*c* of the motor 3 as well as the flow of the air flowing from the inner plate 32 in the windings 3*c* direction.

FIG. 9 is a section view taken along the arrow line D-D portion shown in FIG. 7, showing the position relationship between the inner plate 32 and brushless motor stator portion; that is, it is a partial section view, showing the flow of the air which flows from the inner plate 32 into the stator. FIG. 9 shows well the position relationship between the support pillars 32*c* of the inner plate 32 and the slots 3*d* of the motor 3. As shown in FIG. 9, the cooling fan, which has been taken in from the air intake port 31, passes through the ventilation ports 32*d*, flows into the space of the body portion 6*a* where the motor 3 is disposed, passes through the front portions of the windings 3*c* of the motor 3, and flows to the slots 3*d*. When a brushless motor is used as the motor 3, since the amount of heat generated by the windings 3*c* is large, the cooling air may be allowed to pass through the front portions of the windings 3*c*, whereby the motor 3 can be cooled with high efficiency.

Figure 10:
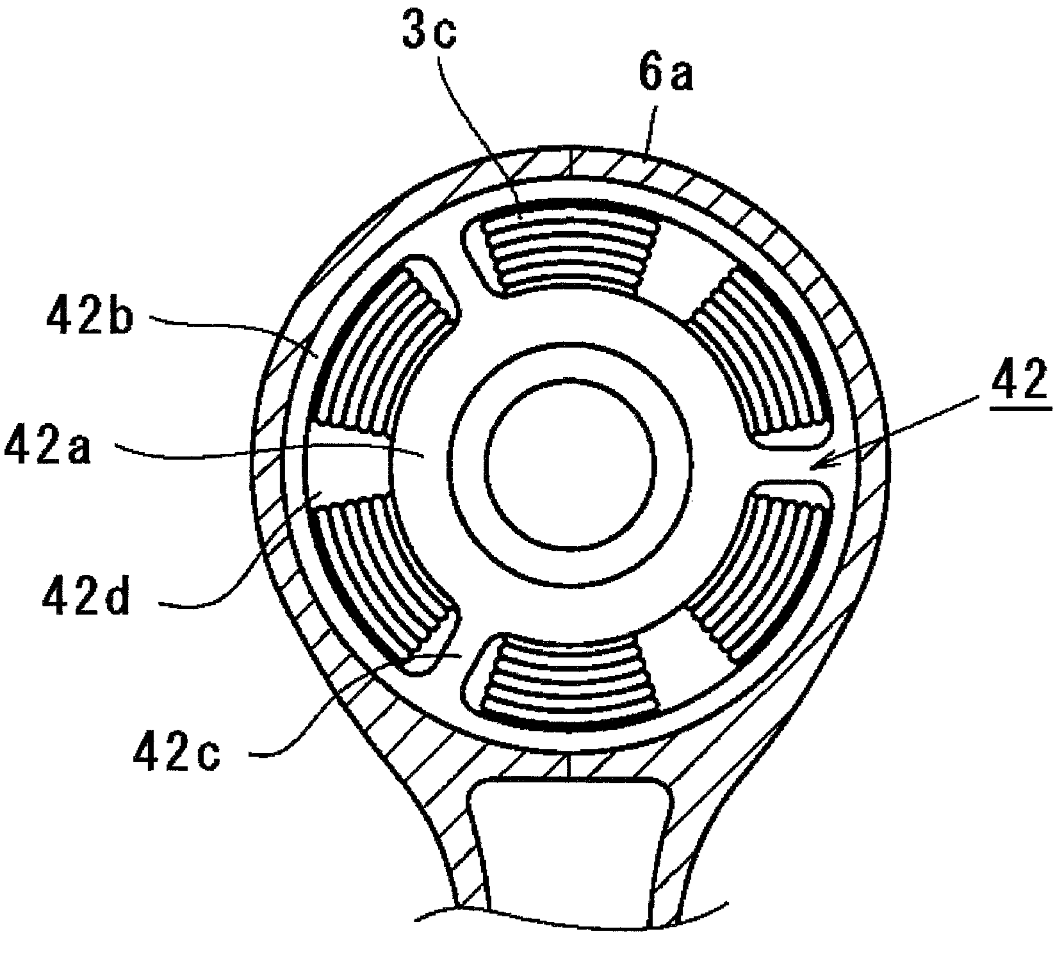
FIG. 10 is a section view of an inner plate 42 according to a modification of the invention, showing the shape of the section of the arrow mark C-C portion shown in FIG. 1.

FIG. 10 shows a modification of the embodiment shown in FIGS. 7 and 8. In the present modification, the number of support pillars 42*c*, which are formed in an inner plate 42, is set three, that is, half the six slots 3*d*. Even when the number of the slots 3*d* of the motor 3 and the number of the ventilation ports 32*d* of the inner plate 32 are set not coincident with each other in this manner, the cooling efficiency can be enhanced. However, when the number of the slots 3*d* of the motor 3 and the number of the ventilation ports 32*d* of the inner plate 32 are set coincident with each other as shown in FIG. 7, the cooling efficiency can be enhanced most. Also, in FIG. 10, the inside diameter of the ventilation port 42*d* of the inner plate 42, that is, the inner peripheral ring 42*a* thereof is set slightly larger than the outside diameter of the rotator 3*b*. Owing to this, the cooling air passing through the ventilation ports 42*d* is easier to come into contact with the outer peripheral sides of the windings 3*c* of the rotator 3*b*, which can enhance the cooling efficiency further.

Figure 11:
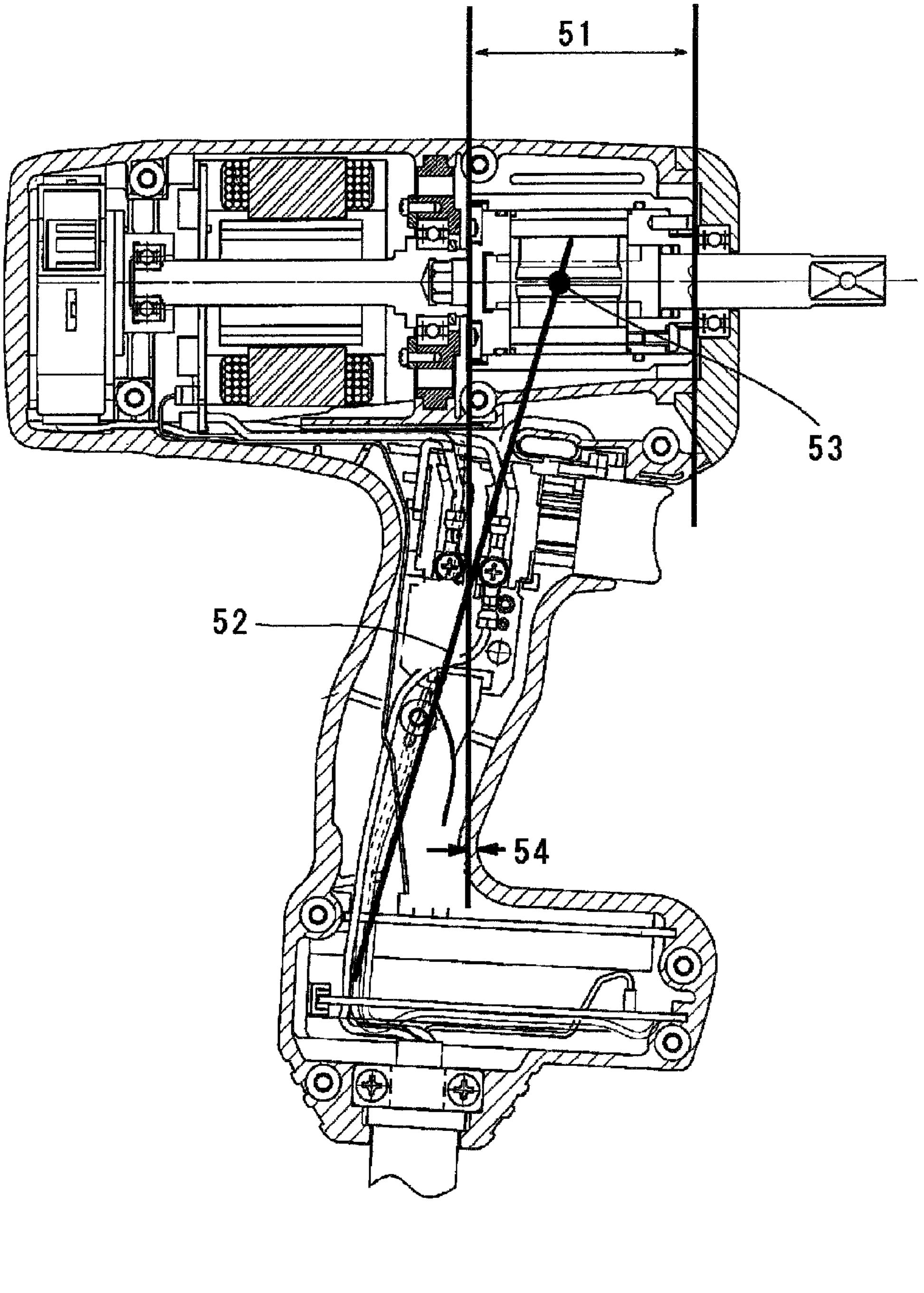
FIG. 11 illustrates the position relationship between the oil pulse unit 4 and handle portion 6*b* of the oil pulse tool according to the embodiment of the invention.

FIG. 11 illustrates the position relationship between the oil pulse unit 4 and handle portion 6*b* according to the present embodiment. The oil pulse mechanism is a striking mechanism which generates low noises, that is, vibrations generated in the striking operation thereof are small; however, reaction forces generated in the striking operation are large. That is, a reaction movement is an arc movement having a striking source as the center thereof, a reacting force increases as it becomes distant from the striking source. According to the present invention, the oil pulse unit 4 and handle portion 6*b* are made to approach each other in the back-and-forth direction, whereby the grip portion of the handle portion 6*b* can be made nearer to the striking source and thus the reaction force at the grip position can be reduced. Specifically, in an oil pulse tool structured such that the front end portion of the oil pulse unit 4 is situated adjacent to the front end portion of the body portion 6*a* of the housing 6, the handle portion 6*b* of the housing 6 is set substantially just below the oil pulse unit 4. Therefore, the extended line of the longitudinal direction center line 52 of the handle portion 6*b* and a crossing point 53 crossing the center axis of the output shaft 5 are set to exist within the arrangement position 51 of the oil pulse unit 4 when they are viewed from the axial direction (back-and-forth direction) of the output shaft 5. Also, when the rear end position of the oil pulse unit 4 is compared with the position where the handle portion 6*b* retreats most, as shown by an arrow mark range 54 in FIG. 11, the rear end position of the oil pulse unit 4 is set to be backward of the most retreated position of the handle portion 6*b*. In this structure, since, when a leading end tool such as a socket is mounted on the output shaft 5, the center of gravity of the whole of the tool is near to the handle, the tool balances well in operation and the operation efficiency of the tool can be enhanced.

As has been described heretofore, in a power tool according to the present embodiment, the motor and power transmission mechanism (oil pulse unit) thereof can be cooled with high efficiency while using an inexpensive general purpose cooling fan and, therefore, the durability of the power tool can be enhanced. Also, since the fan is driven asynchronously with the rotation of the motor, the cooling efficiency of the switching element portion of the motor can also be enhanced. Further, according to the present embodiment, there can be realized a power tool which can enhance the strength of the bearing portion thereof for supporting the rotor.

Although the invention has been described heretofore with reference to the embodiment thereof, the invention is not limited to the above-mentioned embodiment but various changes are also possible without departing from the scope of the subject matter of the invention. For example, although, in the present embodiment, description has been given of the invention with reference to an example in which, as a power tool, there is used an oil pulse tool using a brushless dc motor, the invention is not limited to this but it can also be applied similarly to an arbitrary power tool such as an electric drill or an electric glider. Also, the kind of a motor used is not limited to a brushless dc motor but there may also be used a dc motor with a brush or an ac motor.

What is claimed is:

1. A power tool comprising:

a motor that generates a rotational force;

a power transmission mechanism that is driven by the motor to transmit the rotational force and that is connected to a bit; and a housing including a handle portion that houses the motor and the power transmission mechanism therein, wherein an electric fan for cooling the power transmission mechanism or the motor is provided inside the housing, wherein the power transmission mechanism, the motor and the electric fan are arranged in this order from front, wherein the electric fan is disposed at a rear side so as to be interposed between the motor and a back wall of the housing, and wherein the handle portion is set directly underneath the power transmission mechanism.

2. The power tool of claim 1, wherein the electric fan sucks the air from a forward of a rotation shaft of the motor, and wherein the electric fan discharges the sucked air from a side wall of the housing in a radial-outward direction thereof.

3. The power tool of claim 2, wherein the rotation shaft of the motor is supported by two bearings respectively disposed at a forward and a rearward of the motor, and wherein the rearward bearing is interposed between the motor and the electric fan.

4. The power tool of claim 3, wherein the electric fan is a blower fan including:

a suction port;

a case; and a discharge port.

5. The power tool of claim 4, wherein the case of the electric fan is mounted onto the housing through an elastic member.

6. The power tool of claim 5, wherein the elastic member is a foaming member.

7. The power tool of claim 6, wherein the elastic member is provided to surround the discharge port and a portion of the case.

8. The power tool of claim 1, wherein the electric fan is driven asynchronously with a rotation of the motor.

9. The power tool of claim 1, wherein the motor is a brushless dc motor, wherein a motor drive circuit substrate, which includes a switching element that controls the brushless dc motor, is disposed on a rear end of the brushless dc motor so as to be interposed between the motor and the electric fan.

10. The power tool of claim 1, wherein the electric fan is mounted not on the rotation shaft of the motor.

11. A power tool comprising:

a motor that generates a rotational force;

a power transmission mechanism that is driven by the motor to transmit the rotational force and that is connected to a bit; and a housing including a handle portion that houses the motor and the power transmission mechanism therein, wherein an electric fan for cooling the power transmission mechanism or the motor is provided inside the housing, wherein the power transmission mechanism, the motor and the electric fan are arranged in this order from front, wherein the electric fan is disposed at a rear side so as to be interposed between the motor and a back wall of the housing, and wherein the handle portion is set substantially below the power transmission mechanism, and wherein the motor is a brushless dc motor, wherein a motor drive circuit substrate, which includes a switching element that controls the brushless dc motor, is disposed on a rear end of the brushless dc motor so as to be interposed between the motor and the electric fan.

12. A power tool comprising:

a motor that generates a rotational force;

a power transmission mechanism that is driven by the motor to transmit the rotational force and that is connected to a bit; and a housing including a handle portion that houses the motor and the power transmission mechanism therein, wherein an electric fan for cooling the power transmission mechanism or the motor is provided inside the housing, wherein the power transmission mechanism, the motor and the electric fan are arranged in this order from front, wherein the electric fan is disposed at a rear side so as to be interposed between the motor and a back wall of the housing, and wherein the handle portion is set substantially below the power transmission mechanism, and a crossing point, at which a center line of the handle portion and a center axis of an output shaft of the motor crosses, is set to exist within an arrangement portion of the power transmission mechanism when viewed in the axial direction of the output shaft.

* * * * *